Aug. 31, 1926.
J. P. SOUSA, JR
1,597,734
APPAREL BELT
Filed April 28, 1922
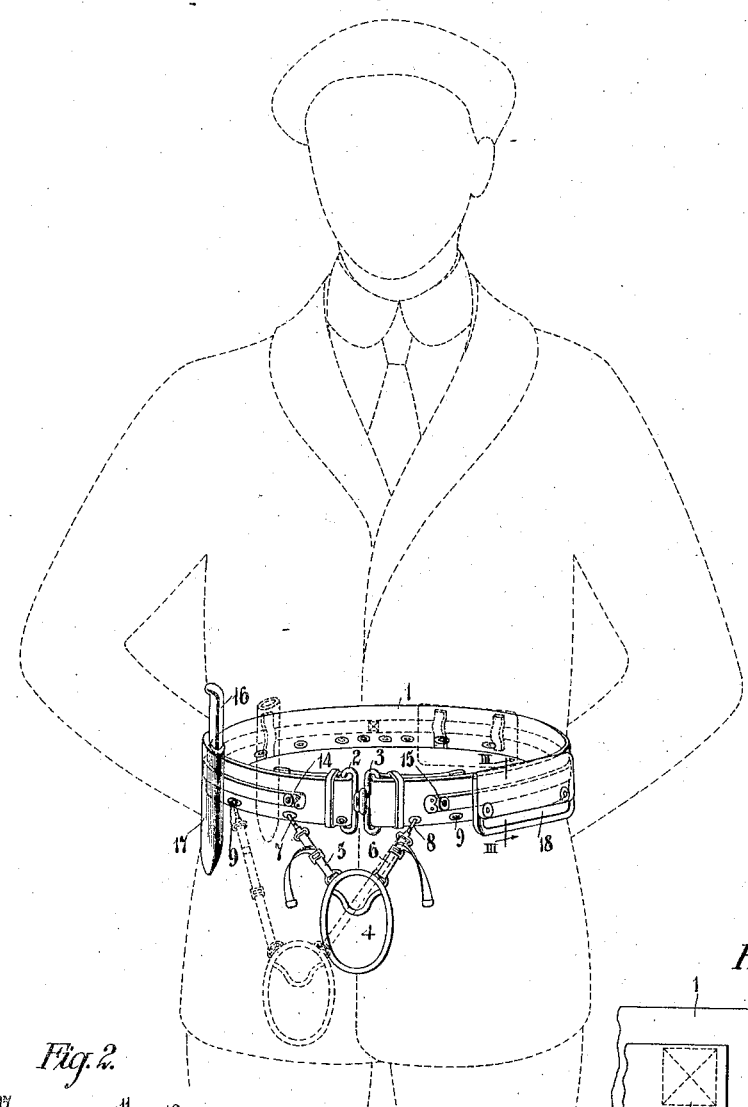
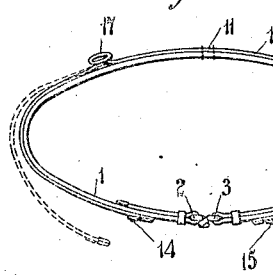
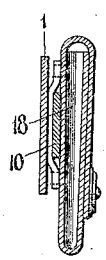
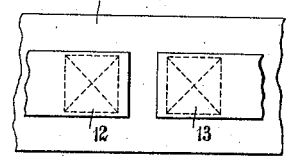
INVENTOR
John Philip Sousa Jr
ATTORNEYS Patented Aug. 31, 1926.

1,597,734

UNITED STATES PATENT OFFICE.

JOHN PHILIP SOUSA, JR., OF SCARSDALE, NEW YORK.

APPAREL BELT.

Application filed April 28, 1922. Serial No. 557,176.

One object of my invention is to provide a novel apparel belt comprising a main belt having means for removably attaching its ends together, and an auxiliary belt secured intermediate its ends to the main belt and having devices for removably attaching the ends of the auxiliary belt to the main belt, said auxiliary belt being arranged to slidably receive different articles without unfastening the main belt, whereby the said articles may be slid along the auxiliary belt to different positions into and out of the way to suit the convenience of the wearer.

Another object of my invention is to provide an apparel belt with a fishing rod rest, the suspension straps of the rest being adjustable as to length and the free ends of the said straps having devices for adjustably attaching the rod rest to the main belt in the desired position for use.

Practical embodiments of my invention are represented in the accompanying drawings, in which—

Fig. 1 represents my improved apparel belt in perspective as in use, the fishing rod rest being shown in full lines in one of its adjusted positions and in dotted lines in another of its adjusted positions, and each of the two articles carried by the belt being shown in full lines in one position and in dotted lines in another position.

Fig. 2 represents a top plan view of the belt, the free ends of the auxiliary belt straps being shown in full lines attached to the main belt and in dotted lines detached therefrom.

Fig. 3 represents a very much enlarged transverse section taken in the plane of the line III—III of Fig. 1.

Fig. 4 represents a detail back view of the belt showing the auxiliary belt comprising two members secured to the main belt, as distinguished from the continuous member shown in Figs. 1 and 2.

The main belt is denoted by 1 and it may be made of any suitable material of the desired width. The free ends of the main belt are provided with attaching devices 2 and 3 for removably fastening the ends of the belt together around the waist of the wearer.

The fishing rod rest comprises the pocket 4, the suspension straps 5, 6, which suspension straps are adjustable as to length. The free ends of these suspension straps are provided with suitable devices, such as snap hooks 7, 8 for attaching the fishing rod rest to the main belt. In the present instance this main belt is shown as having a plurality of eyelets 9 for receiving the snap hooks 7, 8. By lengthening and shortening the suspension straps 5, 6 and by causing the snap hooks 7, 8 to engage the desired eyelets 9 in the main belt, the position of the pocket 4 of the rod rest may be adjusted to suit the requirements of the wearer, all of this being accomplished without unfastening the main belt.

The main belt is provided along its exterior with an auxiliary belt 10, secured about midway its ends 11, to the main belt about midway its ends. This auxiliary belt may be a single member as illustrated in Figs. 1 and 2 or it may be two members secured at 12 and 13, as illustrated in Fig. 4.

The ends of the auxiliary belt are removably secured to the main belt in the present instance by providing snap fasteners 14, 15.

This auxiliary belt is arranged to slidably receive many different articles which the wearer may desire to carry, which articles may be slid along the auxiliary belt into and out of the way without unfastening the main belt or unfastening the free ends of the auxiliary belt.

In the present instance I have shown a knife 16 and its sheath 17 slidably engaged with one of the auxiliary belt straps, and a fishing hook case 18 slidably engaged with the other auxiliary belt strap. It will be understood that these two articles are only examples of many different articles that may be carried by the auxiliary belt. When these articles are not desired, they may be slid along the auxiliary belt to positions at the back of the wearer, out of the way, and when they are required for use they may be quickly and readily slid around to the front of the wearer within easy reach.

From the above description it will be seen that I have provided an apparel belt which, when once adjusted to suit the comfort of the wearer, need not be readjusted for the attachment of the articles desired, which articles may be readily attached to the auxiliary belt without disturbing the adjustment of the main belt. This renders the apparel belt particularly well adapted for sport wear, where it is frequently desirable that no articles be carried by the belt and also frequently desirable that certain predetermined articles be carried by the belt to the exclusion of other articles.

It is evident that various changes may be made in the construction, form and arrangement of the several parts without departing from the spirit and scope of my invention, hence I do not wish to be limited to the particular embodiments herein shown and described, but—

What I claim is:—

1. An apparel belt comprising a main belt, means for removably securing its ends together and an auxiliary belt arranged to permit articles carried thereby to be slid along the same from front to back and vice versa, said auxiliary belt being permanently secured intermediate its ends to the main belt and removably secured at its ends to the main belt.

2. An apparel belt comprising a main belt, means for removably securing its ends together, an auxiliary belt arranged to slidably carry predetermined articles, said auxiliary belt being permanently secured about midway its ends to the back of the main belt about midway its ends, and means for removably securing the ends of the auxiliary belt to the main belt whereby said articles may be slid along the auxiliary belt into position for ready use at the front of the main belt or out of the way at the back thereof.

In testimony, that I claim the foregoing as my invention, I have signed my name this 21st day of April, 1922.

JOHN PHILIP SOUSA, Jr.